United States Patent
Watanabe et al.

(10) Patent No.: US 10,771,700 B2
(45) Date of Patent: Sep. 8, 2020

(54) IMAGE BLUR CORRECTION APPARATUS, INTERCHANGEABLE LENS, CAMERA BODY, IMAGE BLUR CORRECTION METHOD, AND STORAGE MEDIUM

(71) Applicant: CANON KABUSHIKI KAISHA, Tokyo (JP)

(72) Inventors: Takeshi Watanabe, Tokyo (JP); Masafumi Kimura, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/240,977

(22) Filed: Jan. 7, 2019

(65) Prior Publication Data

US 2019/0222762 A1    Jul. 18, 2019

(30) Foreign Application Priority Data

Jan. 15, 2018 (JP) .................... 2018-004465
Dec. 20, 2018 (JP) .................... 2018-238649

(51) Int. Cl.
*H04N 5/232* (2006.01)
*H04N 5/38* (2006.01)
*H04N 5/225* (2006.01)
*G02B 27/64* (2006.01)

(52) U.S. Cl.
CPC ....... *H04N 5/23267* (2013.01); *G02B 27/646* (2013.01); *H04N 5/2254* (2013.01); *H04N 5/38* (2013.01)

(58) Field of Classification Search
CPC .... H04N 5/23267; H04N 5/2254; H04N 5/38; H04N 5/23287; H04N 5/23258; H04N 5/23209; G02B 27/646

USPC ........................................ 348/208.6
See application file for complete search history.

(56) References Cited

U.S. PATENT DOCUMENTS

2014/0111661 A1* 4/2014 Watanabe .......... H04N 5/23267
                                                        348/208.6
2015/0281582 A1* 10/2015 Sakurai ............. H04N 5/23287
                                                        348/208.2

FOREIGN PATENT DOCUMENTS

JP        2015-194711 A    11/2015

* cited by examiner

*Primary Examiner* — Lin Ye
*Assistant Examiner* — Chan T Nguyen
(74) *Attorney, Agent, or Firm* — Cowan, Liebowitz & Latman, P.C.

(57) ABSTRACT

There is provided an image blur correction apparatus. A detection unit detects shake occurring in an image capturing apparatus. Based on the shake, a determination unit determines a first correction amount and a second correction amount that are for correcting image blur. A transmission unit transmits a second correction amount to a second image blur correction apparatus via a communication device, the second image blur correction apparatus controlling a second correction member based on the second correction amount. An acquisition unit acquires a correction error of the second correction member caused by a communication delay of the second correction amount in the communication device. Based on the first correction amount and the correction error, a control unit controls a first correction member configured to correct image blur of the image capturing apparatus so as to reduce the correction error.

26 Claims, 13 Drawing Sheets

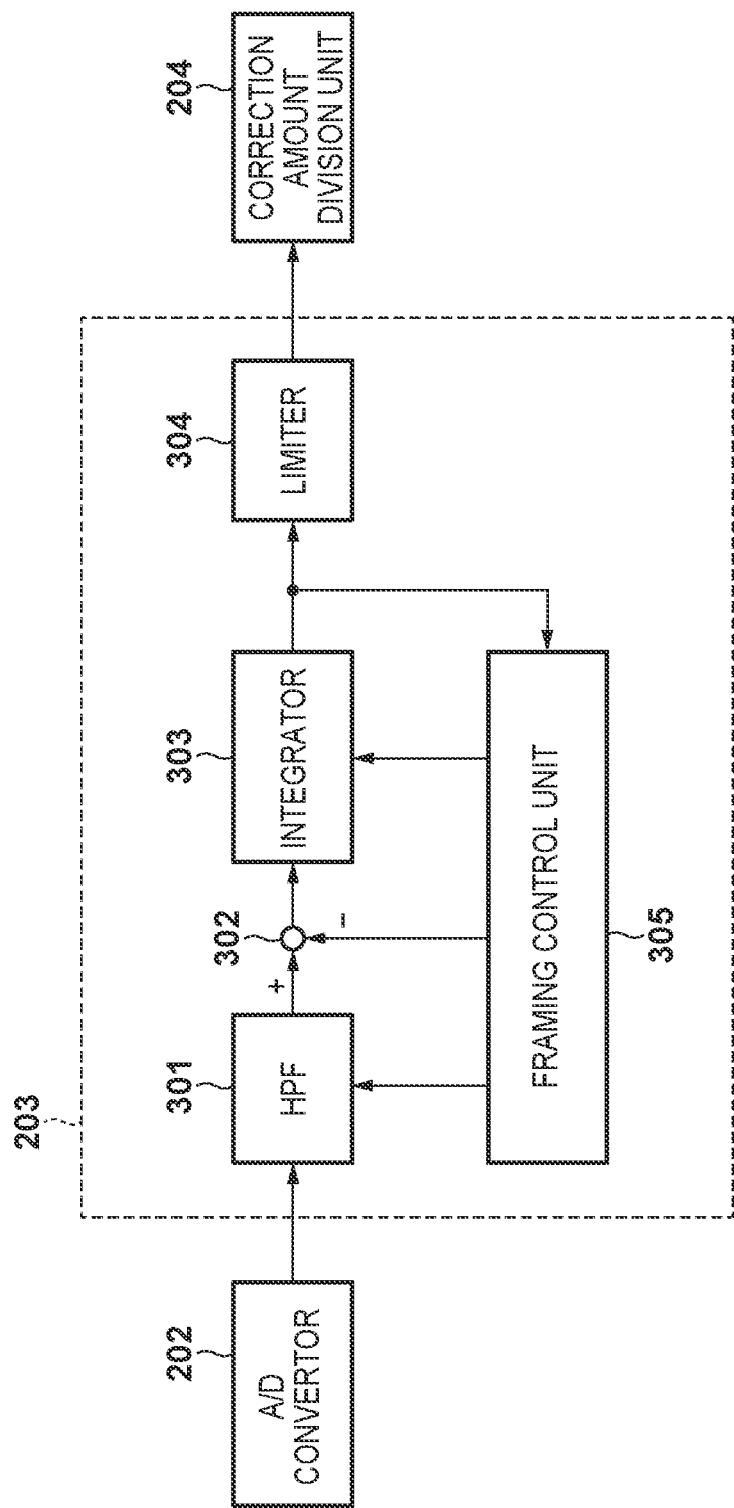

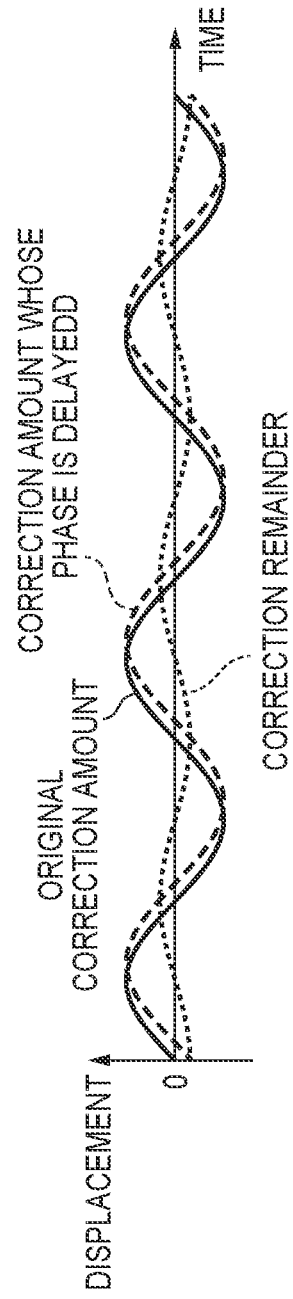

ated in an interchangeable lens to be separated from the camera body.

IMAGE BLUR CORRECTION APPARATUS, INTERCHANGEABLE LENS, CAMERA BODY, IMAGE BLUR CORRECTION METHOD, AND STORAGE MEDIUM

BACKGROUND OF THE INVENTION

Field of the Invention

The present invention relates to an image blur correction apparatus, an interchangeable lens, a camera body, an image blur correction method, and a storage medium.

Description of the Related Art

Technologies for correcting image blur caused by shake applied to an image capturing apparatus are widespread. As a method for correcting image blur, there is optical image blur correction that corrects image blur by driving a correction optical system, which is part of the optical system, in a plane perpendicular to the optical axis according to the detected shake. Also, as another method, there is image sensor shift-type image blur correction that corrects image blur by driving the image sensor in a plane perpendicular to the optical axis according to the detected shake.

Also, in recent years, technologies have emerged that expand the range over which image blur correction is possible, by driving these plurality of correction members in a coordinated manner, enabling correction of even large camera shake of the sort that could not be properly corrected with only one correction member. Japanese Patent Laid-Open No. 2015-194711 discloses a technology that divides an image blur correction signal into a high frequency band and a low frequency band, and performs correction of high frequency image blur with one correction member and correction of low frequency image blur with another correction member.

The image capturing apparatus of Japanese Patent Laid-Open No. 2015-194711 calculates the image blur correction signal based on the output of an angular velocity sensor that is mounted in an interchangeable lens, and divides the calculated image blur correction signal. The image capturing apparatus then operates the image blur correction apparatuses of the interchangeable lens and the camera body in a coordinated manner, by transmitting one of the divided image blur correction signals to the camera body via a communication unit. At this time, a phase delay occurs in the image blur correction on the camera body side due to a communication delay between the interchangeable lens and the camera body, and the image blur correction effect diminishes. As a countermeasure, a method has been proposed that involves dividing the image blur correction signal calculated by the interchangeable lens into a high frequency band and a low frequency band, transmitting the low frequency component which is less susceptible to the effect of a phase delay to the camera body, and correcting low frequency image blur with the image blur correction apparatus of the camera body. However, even if the image blur correction signal in the low frequency band is less susceptible to the effect of a phase delay, the extent to which the signal is affected will be dependent on the amount of communication delay, and thus the effect still remains depending on the magnitude of the communication delay. Accordingly, in order to reduce the effect of the communication delay, a high-speed communication cycle is required between the interchangeable lens and the camera body, which is problematic in that a high-speed CPU is required and power consumption increases due to the increased communication frequency. Also, if a cutoff frequency for dividing an image blur correction signal is not set appropriately according to the communication delay, there will be an inevitable reduction in the image blur correction effect, and thus system design is difficult.

SUMMARY OF THE INVENTION

The present invention has been made in consideration of such circumstances, and provides a technology for reducing a correction error caused by a communication delay of a correction amount between two image blur correction apparatuses that correct image blur in a coordinated manner.

According to a first aspect of the present invention, there is provided an image blur correction apparatus including a communication device configured to communicate with a second image blur correction apparatus that controls a second correction member configured to correct image blur of an image capturing apparatus, the image blur correction apparatus comprising one or more processors and a memory storing a program which, when executed by the one or more processors, causes the image blur correction apparatus to function as: a detection unit configured to detect shake occurring in the image capturing apparatus; a determination unit configured to, based on the shake, determine a first correction amount and a second correction amount that are for correcting the image blur; a transmission unit configured to transmit the second correction amount to the second image blur correction apparatus via the communication device, the second image blur correction apparatus controlling the second correction member based on the second correction amount; an acquisition unit configured to acquire a correction error of the second correction member caused by a communication delay of the second correction amount in the communication device; and a control unit configured to, based on the first correction amount and the correction error, control a first correction member configured to correct image blur of the image capturing apparatus so as to reduce the correction error.

According to a second aspect of the present invention, there is provided an image blur correction apparatus including a communication device configured to communicate with a second image blur correction apparatus that controls a second correction member configured to correct image blur of an image capturing apparatus, the image blur correction apparatus comprising one or more processors and a memory storing a program which, when executed by the one or more processors, causes the image blur correction apparatus to function as: a detection unit configured to detect shake occurring in the image capturing apparatus; a determination unit configured to, based on the shake, determine a first correction amount for correcting the image blur; a transmission unit configured to transmit the first correction amount to the second image blur correction apparatus via the communication device, the second image blur correction apparatus controlling the second correction member based on a third correction amount obtained by subtracting the first correction amount from a second correction amount for correcting the image blur that is determined based on shake occurring in the image capturing apparatus detected by a second detection unit; an acquisition unit configured to acquire a correction error of the second correction member caused by a communication delay of the first correction amount in the communication device; and a control unit configured to, based on the first correction amount and the correction error, control a first correction member configured to correct image blur of the image capturing apparatus so as to reduce the correction error.

According to a third aspect of the present invention, there is provided an image blur correction method executed by an image blur correction apparatus including a communication device configured to communicate with a second image blur correction apparatus that controls a second correction member configured to correct image blur of an image capturing apparatus, the image blur correction method comprising: detecting shake occurring in the image capturing apparatus; based on the shake, determining a first correction amount and a second correction amount that are for correcting the image blur; transmitting the second correction amount to the second image blur correction apparatus via the communication device, the second image blur correction apparatus controlling the second correction member based on the second correction amount; acquiring a correction error of the second correction member caused by a communication delay of the second correction amount in the communication device; and based on the first correction amount and the correction error, controlling a first correction member configured to correct image blur of the image capturing apparatus so as to reduce the correction error.

According to a fourth aspect of the present invention, there is provided an image blur correction method executed by an image blur correction apparatus including a communication device configured to communicate with a second image blur correction apparatus that controls a second correction member configured to correct image blur of an image capturing apparatus, the image blur correction method comprising: detecting, by a first detector, shake occurring in the image capturing apparatus; based on the shake, determining a first correction amount for correcting the image blur; transmitting the first correction amount to the second image blur correction apparatus via the communication device, the second image blur correction apparatus controlling the second correction member based on a third correction amount obtained by subtracting the first correction amount from a second correction amount for correcting the image blur that is determined based on shake occurring in the image capturing apparatus detected by a second detector; acquiring a correction error of the second correction member caused by a communication delay of the first correction amount in the communication device; and based on the first correction amount and the correction error, controlling a first correction member configured to correct image blur of the image capturing apparatus so as to reduce the correction error.

According to a fifth aspect of the present invention, there is provided a non-transitory computer-readable storage medium which stores a program for causing an image blur correction apparatus to execute an image blur correction method, the image blur correction apparatus including a communication device configured to communicate with a second image blur correction apparatus that controls a second correction member configured to correct image blur of an image capturing apparatus, the image blur correction method comprising: detecting shake occurring in the image capturing apparatus; based on the shake, determining a first correction amount and a second correction amount that are for correcting the image blur; transmitting the second correction amount to the second image blur correction apparatus via the communication device, the second image blur correction apparatus controlling the second correction member based on the second correction amount; acquiring a correction error of the second correction member caused by a communication delay of the second correction amount in the communication device; and based on the first correction amount and the correction error, controlling a first correction member configured to correct image blur of the image capturing apparatus so as to reduce the correction error.

According to a sixth aspect of the present invention, there is provided a non-transitory computer-readable storage medium which stores a program for causing an image blur correction apparatus to execute an image blur correction method, the image blur correction apparatus including a communication device configured to communicate with a second image blur correction apparatus that controls a second correction member configured to correct image blur of an image capturing apparatus, the image blur correction method comprising: detecting, by a first detector, shake occurring in the image capturing apparatus; based on the shake, determining a first correction amount for correcting the image blur; transmitting the first correction amount to the second image blur correction apparatus via the communication device, the second image blur correction apparatus controlling the second correction member based on a third correction amount obtained by subtracting the first correction amount from a second correction amount for correcting the image blur that is determined based on shake occurring in the image capturing apparatus detected by a second detector; acquiring a correction error of the second correction member caused by a communication delay of the first correction amount in the communication device; and based on the first correction amount and the correction error, controlling a first correction member configured to correct image blur of the image capturing apparatus so as to reduce the correction error.

Further features of the present invention will become apparent from the following description of exemplary embodiments with reference to the attached drawings.

BRIEF DESCRIPTION OF THE DRAWINGS

FIG. 3 is a block diagram illustrating an image blur correction amount calculation unit 203 in detail.

FIG. 7 is a graph showing a correction remainder caused by a phase delay of the correction amount.

DESCRIPTION OF THE EMBODIMENTS

Figure 1:
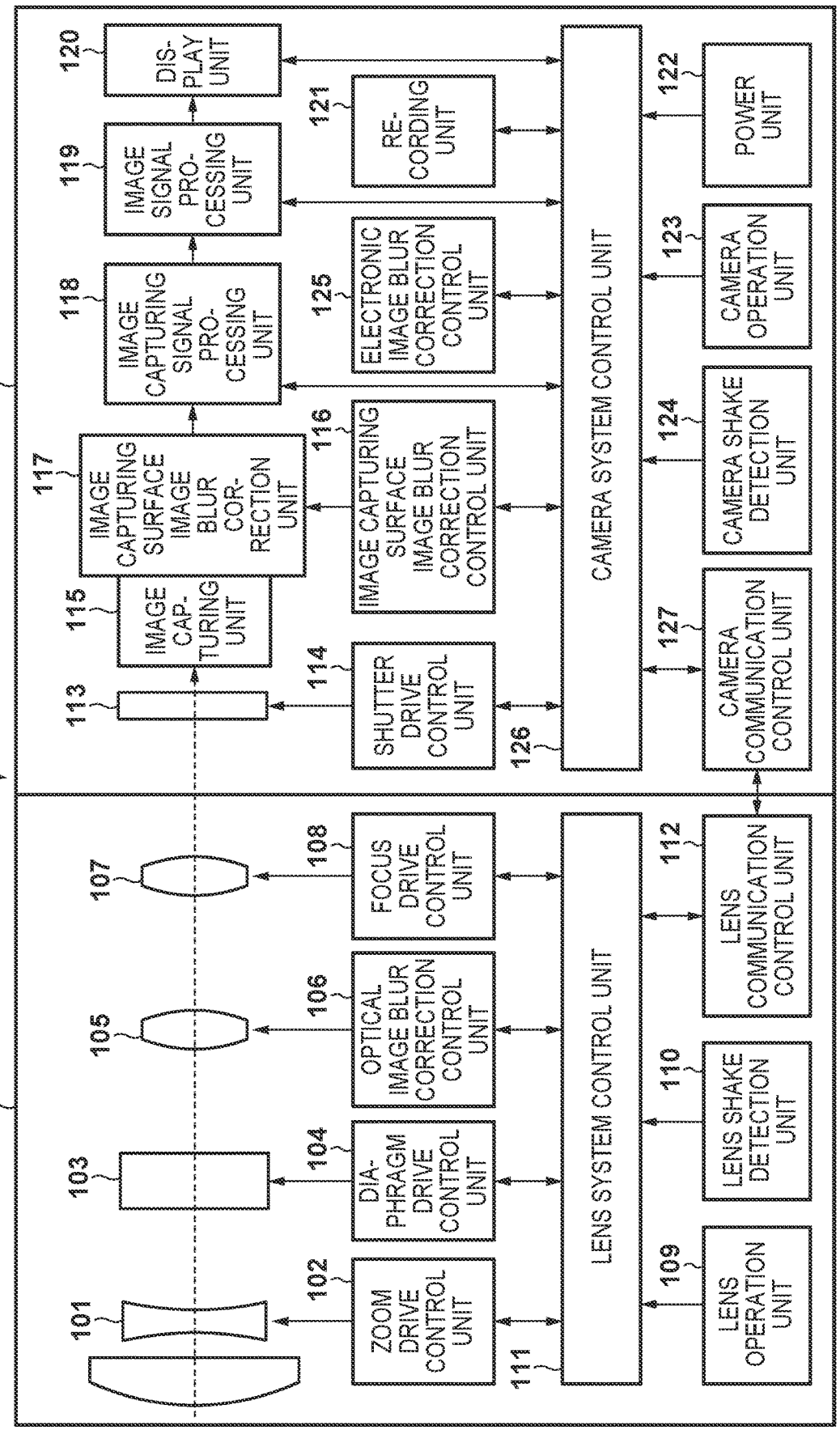
FIG. 1 is a block diagram showing the configuration of an image capturing apparatus 100 including an image blur correction apparatus.

Hereinafter, embodiments of the present invention will be described with reference to the attached drawings. Elements that are given the same reference numerals throughout all of the attached drawings represent the same or similar elements. Note that the technical scope of the present invention is defined by the claims, and is not limited by the following respective embodiments. Also, not all of the combinations of the aspects that are described in the embodiments are necessarily essential to the present invention. Also, the aspects that are described in the individual embodiments can be combined as appropriate.

In the following embodiments, vibration that is applied to an image capturing apparatus is referred to as "shake", and the effect on a captured image that occurs as a result of shake applied to the image capturing apparatus is referred to as "image blur".

First Embodiment

FIG. 1 is a block diagram showing the configuration of an image capturing apparatus 100 that includes an image blur correction apparatus. The image capturing apparatus 100 is an interchangeable-lens digital camera capable of shooting still images and moving images. However, the present embodiment is not limited to an interchangeable-lens digital camera, and the present embodiment can be applied to various types of image capturing apparatuses.

The image capturing apparatus 100 is constituted by an interchangeable lens 100a and a camera body 100b, with the interchangeable lens 100a being mounted for use to the camera body 100b. A zoom unit 101 of the interchangeable lens 100a includes a zoom lens that performs magnification. A zoom drive control unit 102 performs drive control of the zoom unit 101. A diaphragm unit 103 has a function of a diaphragm. A diaphragm drive control unit 104 performs drive control of the diaphragm unit 103. An image blur correction unit 105 is provided with an image blur correction lens such as a shift lens or the like (hereinafter, also referred to as a "correction lens" or "OIS"). An image blur correction lens is movable in a direction perpendicular to the optical axis of the image capturing apparatus 100. An optical image blur correction control unit 106 performs drive control of the image blur correction unit 105. A focus unit 107 includes a focus lens that performs focus adjustment and forms an object image. A focus drive control unit 108 performs drive control of the focus unit 107.

A lens operation unit 109 is an operation unit that is used by a user to operate the interchangeable lens 100a. A lens shake detection unit 110 detects the amount of shake that is applied to (that occurs in) the image capturing apparatus 100 or the interchangeable lens 100a, and outputs a detection signal to a lens system control unit 111. The lens system control unit 111 is provided with a CPU (central processing unit), and performs overall control of the drive control units and the correction control unit of the interchangeable lens 100a and controls the entire interchangeable lens 100a. The lens system control unit 111 communicates with a camera communication control unit 127 of the camera body 100b, via a lens communication control unit 112. That is, in a state where the interchangeable lens 100a is mounted and electrically connected to the camera body 100b, the interchangeable lens 100a and the camera body 100b communicate with each other, via the lens communication control unit 112 and the camera communication control unit 127.

Next, the camera body 100b will be described. The camera body 100b is provided with a shutter unit 113. A shutter drive control unit 114 performs drive control of the shutter unit 113. An image capturing unit 115 is provided with an image sensor, and photoelectrically converts an optical image formed by light that has passed through each lens group and outputs an electrical signal. The image sensor of the image capturing unit 115 is movable in a direction perpendicular to the optical axis of the image capturing apparatus 100. An image capturing surface image blur correction unit 117 is provided with an image capturing surface image blur correction unit (hereinafter, also referred to as an "image capturing surface correction unit" or "IIS") that moves the image sensor of the image capturing unit 115 to correct image blur. An image capturing surface image blur correction control unit 116 performs drive control of the image capturing surface image blur correction unit 117. An image capturing signal processing unit 118 converts the electrical signal output by the image capturing unit 115 into a video signal. An image signal processing unit 119 processes the video signal output by the image capturing signal processing unit 118 according to the application. For example, the image signal processing unit 119 changes a clipping position of the video signal according to the correction amount of an electronic image blur correction control unit 125. The electronic image blur correction control unit 125 controls image blur correction by clipping images. Note that the clipping position of an image may be changed through coordinate transformation. Changing of the clipping position of an image through coordinate transformation is well-known, and thus a detailed description is omitted here, but may be performed using affine transformation, or information of one pixel may be acquired using interpolation from the information of a plurality of pixels.

A display unit 120 performs image display as needed, based on the signal output by the image signal processing unit 119. A recording unit 121 stores various data such as video information. A power unit 122 supplies power to the entire apparatus according to the application. A camera operation unit 123 is an operation unit that is used by a user to operate the camera body 100b, and outputs an operation signal to a camera system control unit 126. A camera shake detection unit 124 detects the amount of shake that is applied to (that occurs in) the image capturing apparatus 100 or the camera body 100b, and outputs a detection signal to the camera system control unit 126. The camera system control unit 126 is provided with a CPU, and performs overall control of the entire camera body 100b. The camera system control unit 126 communicates with the lens communication control unit 112 of the interchangeable lens 100a via the camera communication control unit 127. That is, in a state where the interchangeable lens 100a is mounted and electrically connected to the camera body 100b, the interchangeable lens 100a and the camera body 100b communicate with each other, via the lens communication control unit 112 and the camera communication control unit 127.

Next, the general operations of the image capturing apparatus 100 will be described. The lens operation unit 109 and the camera operation unit 123 include an image blur correction switch with which ON/OFF of image blur correction can be selected. When a user operates the image blur correction switch to select ON, the lens system control unit 111 and the camera system control unit 126 instruct the optical image blur correction control unit 106, the image capturing surface image blur correction control unit 116 and the electronic image blur correction control unit 125 to perform an image blur correction operation. The image blur correction control units perform control of image blur correction until an OFF instruction of the image blur correction is given.

Also, the camera operation unit 123 includes an image blur correction mode switch with which a first mode and a second mode can be selected in relation to image blur correction. The first mode is a mode in which image blur correction is performed through a combination of optical image blur correction and image capturing surface image blur correction. The second mode is a mode in which image blur correction is performed by using a combination of optical image blur correction, image capturing surface image blur correction, and electronic image blur correction. In the case where the first mode is selected, a wider correction angle can be realized, by performing correction through coordinating optical image blur correction and image capturing surface image blur correction, enabling large shake to be corrected. The readout position of the image capturing unit 115 is fixed, and wider angle shooting can be supported by expanding the readout range as a result. Also, in the case where the second mode is selected, the clipping range of the video signal by the image signal processing unit 119 is narrowed, but larger shake can be handled by changing the clipping position according to the amount of image blur correction.

The camera operation unit 123 includes a shutter release button configured such that a first switch (SW1) and a second switch (SW2) turn on in order according to the amount by which the shutter release button is pressed. SW1 turns on when the user presses the shutter release button approximately halfway, and SW2 turns on when the user presses the shutter release button all the way. As a result of SW1 turning on, the focus drive control unit 108 drives the focus unit 107 to perform focus adjustment, and the diaphragm drive control unit 104 drives the diaphragm unit 103 to set the proper exposure. As a result of SW2 turning on, image data obtained from the optical image exposed by the image capturing unit 115 is stored in the recording unit 121.

Also, the camera operation unit 123 includes a moving image recording switch. The image capturing apparatus 100 starts moving image shooting after the moving image recording switch is pressed, and ends recording when the user presses the moving image recording switch again during recording. When the user operates the shutter release button to turn on SW1 and SW2 during moving image shooting, processing for acquiring and recording a still image during moving image recording is executed. Also, the camera operation unit 123 includes a playback mode selection switch with which a playback mode can be selected. In the case where the playback mode is selected through operation of the playback mode selection switch, the image capturing apparatus 100 stops the image blur correction operation.

Figure 2:
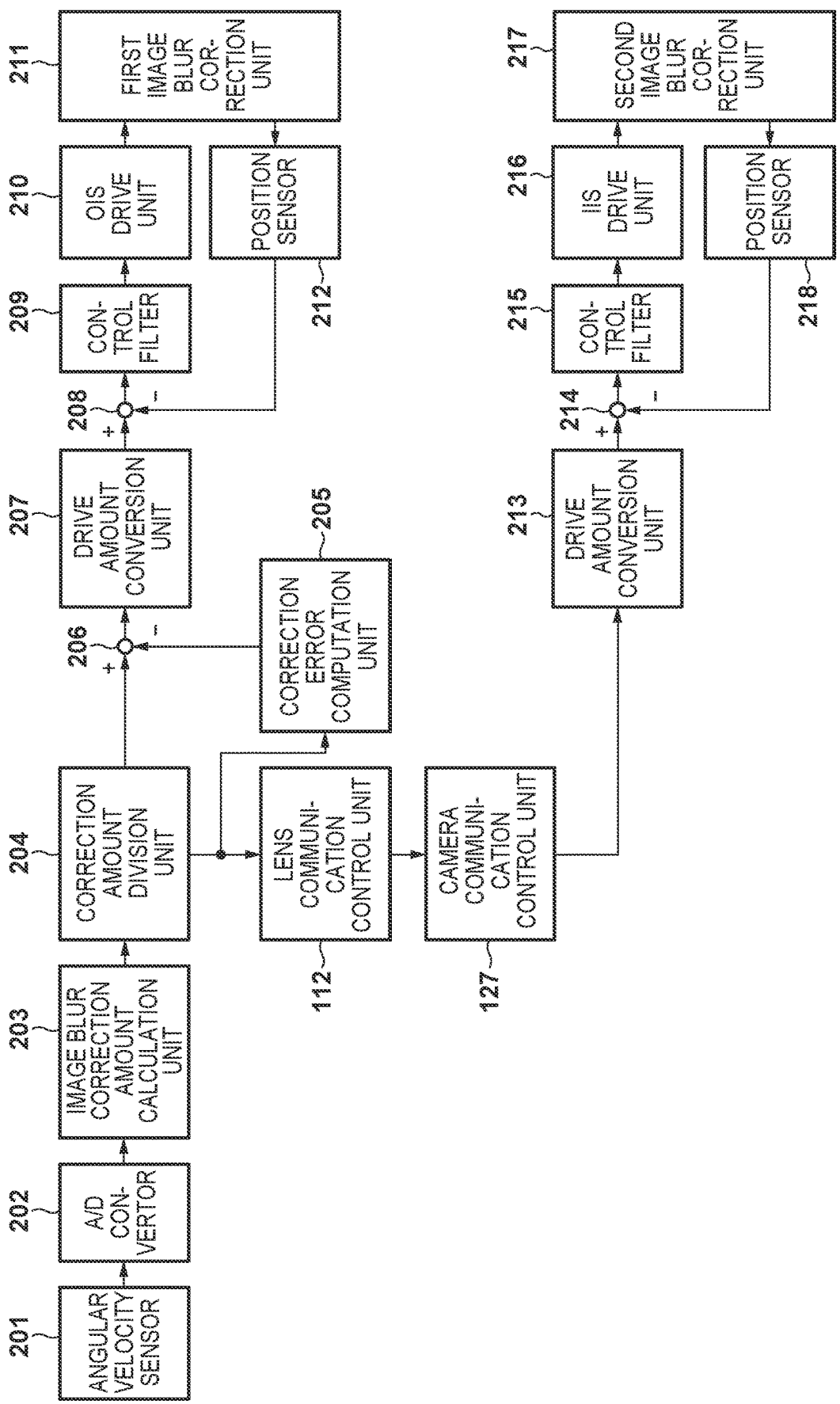
FIG. 2 is a block diagram illustrating image blur correction control according to a first embodiment.

Next, image blur correction control that is executed by the lens system control unit 111 and the camera system control unit 126 will be described, with reference to FIG. 2. FIG. 2 is a block diagram illustrating control for driving a first image blur correction unit 211 and a second image blur correction unit 217 to perform image blur correction based on information relating to shake that is applied to the image capturing apparatus 100.

In FIG. 2, an angular velocity sensor 201 and an A/D convertor 202 are included in the lens shake detection unit 110. An image blur correction amount calculation unit 203, a correction amount division unit 204, a correction error computation unit 205 and a subtractor 206 are implemented by the lens system control unit 111. A drive amount conversion unit 207, a subtractor 208, a control filter 209, an OIS drive unit 210 and a position sensor 212 are included in the optical image blur correction control unit 106. The first image blur correction unit 211 corresponds to the image blur correction unit 105. A drive amount conversion unit 213, a subtractor 214, a control filter 215, an IIS drive unit 216 and a position sensor 218 are included in the image capturing surface image blur correction control unit 116. The second image blur correction unit 217 corresponds to the image capturing surface image blur correction unit 117.

In the present embodiment, the image capturing apparatus 100 acquires the correction amount for image blur correction using the angular velocity sensor 201 and drives the first image blur correction unit 211. Also, the image capturing apparatus 100 transmits the correction amount for the second image blur correction unit 217 from the interchangeable lens 100*a* to the camera body 100*b* via the lens communication control unit 112 and the camera communication control unit 127, and drives the second image blur correction unit 217. That is, in the image blur correction system of the present embodiment, the interchangeable lens 100*a* operates as the master and the camera body 100*b* operates as the slave.

The angular velocity sensor 201 detects the angular velocity of shake that is applied to the image capturing apparatus 100, and outputs a voltage that depends on the detected angular velocity. The output voltage of the angular velocity sensor 201 is converted into digital data by the A/D convertor 202 and acquired as angular velocity data, and the angular velocity data is supplied to the image blur correction amount calculation unit 203. The series of processing from acquisition of the angular velocity data to driving of the image blur correction units is repeatedly performed at a sufficiently high-speed cycle relative to 1 to 20 Hz, which is the frequency band of camera shake, and is repeatedly performed at a cycle of 1000 Hz, for example.

The image blur correction amount calculation unit 203 computes the correction amount for correcting image blur that occurs due to shake that is applied to the image capturing apparatus 100. Note that the image capturing apparatus 100 is provided with two image blur correction units, namely, the first image blur correction unit 211 and the second image blur correction unit 217. However, the correction amount that is calculated by the image blur correction amount calculation unit 203 is a correction amount for correcting image blur of the entire image capturing apparatus 100, rather than a correction amount for each of the two image blur correction units.

FIG. 3 is a block diagram illustrating the image blur correction amount calculation unit 203 in detail. A HPF 301 (high-pass filter) is used in order to remove the DC component and the low frequency component of the angular velocity data detected by the A/D convertor 202. Angular velocity data that has passed through the HPF 301 is converted into angular displacement data through first-order integration performed in an integrator 303. The integration computation that is performed here is imperfect integration in order to prevent saturation, and is computed using a commonly known first-order LPF (low-pass filter). The angular displacement data calculated by the integrator 303 is supplied to a framing control unit 305 and a limiter 304. The limiter 304 applies a restriction to the angular displacement data such that the first image blur correction unit 211 and the second image blur correction unit 217 do not hit the end of the movable range. The angular displacement data to which the restriction is applied by the limiter 304 is output as the output of the image blur correction amount calculation unit 203, that is, the image blur correction amount of the captured image. Note that the image blur correction amount (angular displacement data) that is computed by the image blur correction amount calculation unit 203 is the total value of the correction amounts of the first image blur correction unit 211 and the second image blur correction unit 217. Thus, the limit value that is set in the limiter 304 is the displacement amount obtained by totaling the control range of the first image blur correction unit 211 and the control range of the second image blur correction unit 217.

The framing control unit 305 determines whether an operation intended by the user such as panning or tilting has been performed, and performs control to return the angular displacement data to the center. In other words, the framing control unit 305 removes the shake component caused by framing of the image capturing apparatus 100 intended by the user from the angular velocity (angular displacement data acquired with the A/D convertor 202) detected by the angular velocity sensor 201. Image blur caused by camera shake can thereby be corrected, while performing framing intended by the user. Specifically, a predetermined threshold value further inside the control end of the angular displacement data provided in the limiter 304 is provided, and it is determined that panning has been performed in the case where the angular displacement data that is output by the integrator 303 exceeds the threshold value. In the case where it is determined that panning has been performed, the framing control unit 305 restricts the angular velocity data by setting a high cutoff frequency of the HPF 301 and removing much of the low frequency component. Alternatively, a configuration may be adopted in which the output of the integrator 303 returns to the center, as a result of the framing control unit 305 subtracting an offset from the angular velocity data that is input to the integrator 303. Alternatively, the framing control unit 305 may perform control such that the output of the integrator 303 returns to the center by setting a high cutoff frequency for the LPF computation that is performed by the integrator 303. Performing control in this way enables control to be performed such that the first image blur correction unit 211 and the second image blur correction unit 217 remain within the movable range, even in the case where shake that the user intended, such as panning or tilting, occurs.

Returning to FIG. 2, the correction amount division unit 204 determines a first correction amount that is for controlling the first image blur correction unit 211 and a second correction amount that is for controlling the second image blur correction unit 217. Specifically, the correction amount division unit 204 divides the image blur correction amount of the entire apparatus calculated by the image blur correction amount calculation unit 203 into the first correction amount and the second correction amount. The correction amount division unit 204 outputs the first correction amount to the subtractor 206, and outputs the second correction amount to the lens communication control unit 112 and the correction error computation unit 205.

Figure 4A:
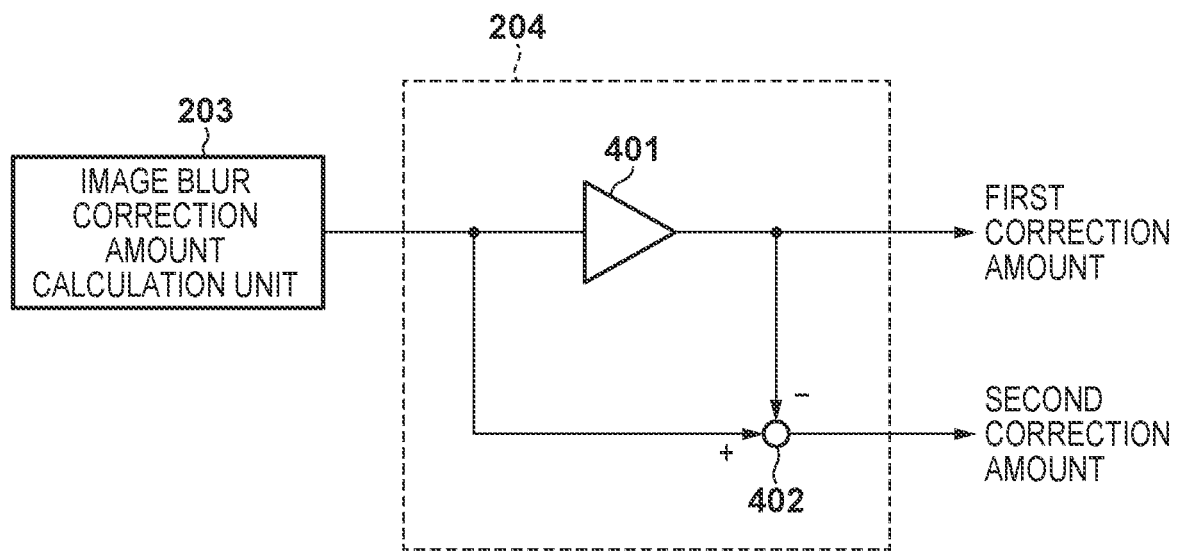
FIGS. 4A and 4B are block diagrams showing an exemplary configuration of a correction amount division unit 204.
Figure 4B:
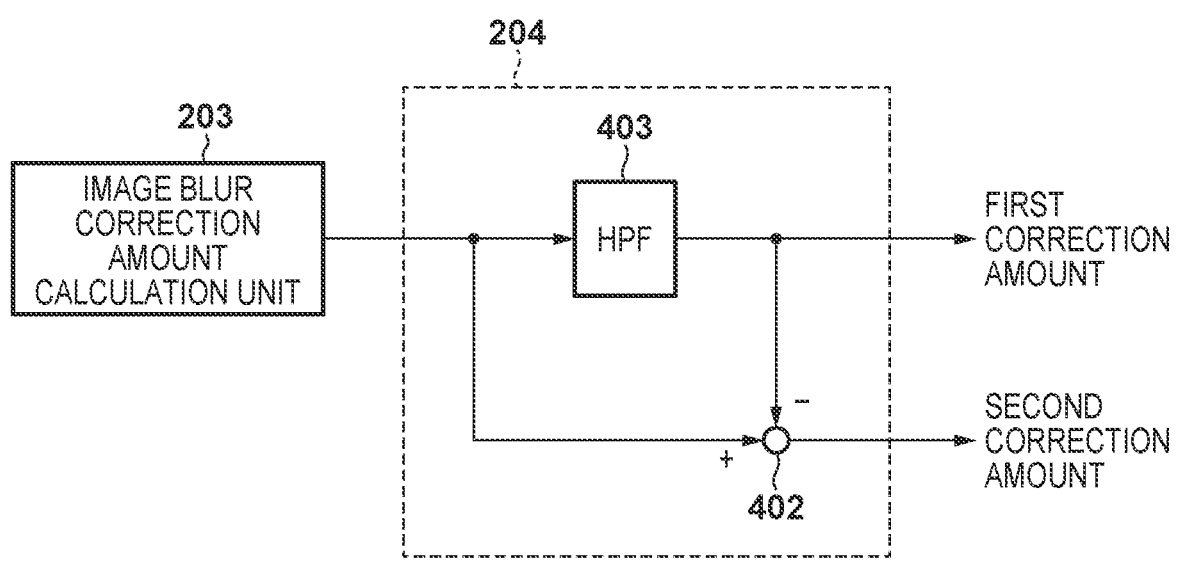

FIGS. 4A and 4B are block diagrams showing an exemplary configuration of the correction amount division unit 204. In FIG. 4A, a multiplier 401 multiplies the image blur correction amount calculated by the image blur correction amount calculation unit 203 by a predetermined magnification K1 and outputs the first correction amount. Here, K1 is a magnification satisfying:

$$0 \leq K1 \leq 1 \tag{1}$$

The image blur correction amount obtained through multiplication with the predetermined magnification K1 by the multiplier 401 is the correction amount for when performing image blur correction with the first image blur correction unit 211. Also, a subtractor 402 calculates a second correction amount that is used when performing image blur correction with the second image blur correction unit 217, by subtracting the first correction amount from the image blur correction amount calculated by the image blur correction amount calculation unit 203. As a result of such an operation, the image blur correction amount calculated by the image blur correction amount calculation unit 203 is divided such that the correction amount of image blur correction of the entire apparatus is obtained when the first correction amount and the second correction amount are added together.

FIG. 4A shows an example in which the image blur correction amount is divided by a predetermined ratio, but a configuration may be adopted in which the image blur correction amount is divided by frequency band. FIG. 4B shows an exemplary configuration of the correction amount division unit 204 in the case of dividing the image blur correction amount by frequency band. A HPF 403 passes only the high frequency band of the image blur correction amount calculated by the image blur correction amount calculation unit 203, and this high frequency component is calculated as the first correction amount. The subtractor 402 extracts the second correction amount (low frequency component), by subtracting the first correction amount (high frequency component) from the image blur correction amount calculated by the image blur correction amount calculation unit 203.

Returning to FIG. 2, the correction error computation unit 205 computes the correction error of the second image blur correction unit 217 caused by the communication delay of the second correction amount in the lens communication control unit 112 and the camera communication control unit 127. The correction error computation unit 205 will be described in detail later.

The subtractor 206 generates a correction amount that reduces the correction error, by subtracting the correction error output by the correction error computation unit 205 from the first correction amount output by the correction amount division unit 204.

The drive amount conversion unit 207 converts the correction amount output by the subtractor 206 into a movement amount for appropriately performing image blur correction with the first image blur correction unit 211, and outputs the movement amount as a drive target position. The position sensor 212 detects position information of the first image blur correction unit 211. The subtractor 208 derives deviation data, by subtracting the position information of the first image blur correction unit 211 from the drive target position. The deviation data is input to the control filter 209, where various signal processing such as gain amplification and phase correction is performed, and the obtained data is supplied to the OIS drive unit 210. The OIS drive unit 210 drives the first image blur correction unit 211 in accordance with the output of the control filter 209. The correction optical system thereby moves in a direction perpendicular to the optical axis. The position information of the first image blur correction unit 211 that has moved is again detected with the position sensor 212 and the next deviation data is calculated. That is, a feedback loop is formed, and the first image blur correction unit 211 is controlled such that the difference between the drive target position and the position information decreases. The correction optical system can thereby be driven so as to track the drive target position.

The second correction amount calculated by the correction amount division unit 204 is transmitted to the camera body 100b via the lens communication control unit 112 and the camera communication control unit 127. The drive amount conversion unit 213 converts the second correction amount received from the interchangeable lens 100a into a movement amount for appropriately performing image blur correction with the second image blur correction unit 217, and outputs the movement amount as a drive target position. The position sensor 218 detects the position information of the second image blur correction unit 217. The subtractor 214 derives deviation data, by subtracting the position information of the second image blur correction unit 217 from the drive target position. The deviation data is input to the control filter 215, where various signal processing such as gain amplification and phase correction is performed, and the obtained data is supplied to the IIS drive unit 216. The IIS drive unit 216 drives the second image blur correction unit 217 in accordance with the output of the control filter 215. The image capturing surface thereby moves in a direction perpendicular to the optical axis.

In this way, the first image blur correction unit 211 and the second image blur correction unit 217 operate in a coordinated manner so as to share correction of image blur corresponding to shake of the entire apparatus. As a result of such coordinated operation, the range over which image blur correction is possible can be expanded.

Here, the effect of communication of the correction amount between the interchangeable lens 100a and the camera body 100b will be described. The correction amount calculated in the interchangeable lens 100a is transmitted to the camera body 100b by communication between the interchangeable lens 100a and the camera body 100b. At this time, a phase delay occurs in the control of the camera body 100b, due to a communication delay, that is, the time period required for communication (and the time period from when communication is received until the next control of the camera body 100b). Here, a phase delay θ when the communication delay is given as ΔT can be calculated as follows.

$$G(s) = e^{-\frac{\Delta T}{2}s} \quad (2)$$

$$G(jw) = e^{-jw\frac{\Delta T}{2}} = \cos w \frac{\Delta T}{2} - j\sin w \frac{\Delta T}{2}$$

$$\theta = G(jw) = -\tan^{-1}\frac{\sin w \frac{\Delta T}{2}}{\cos w \frac{\Delta T}{2}} = -w\frac{\Delta T}{2} \times \frac{180}{\pi} \text{ [degree]}$$

Figure 6:
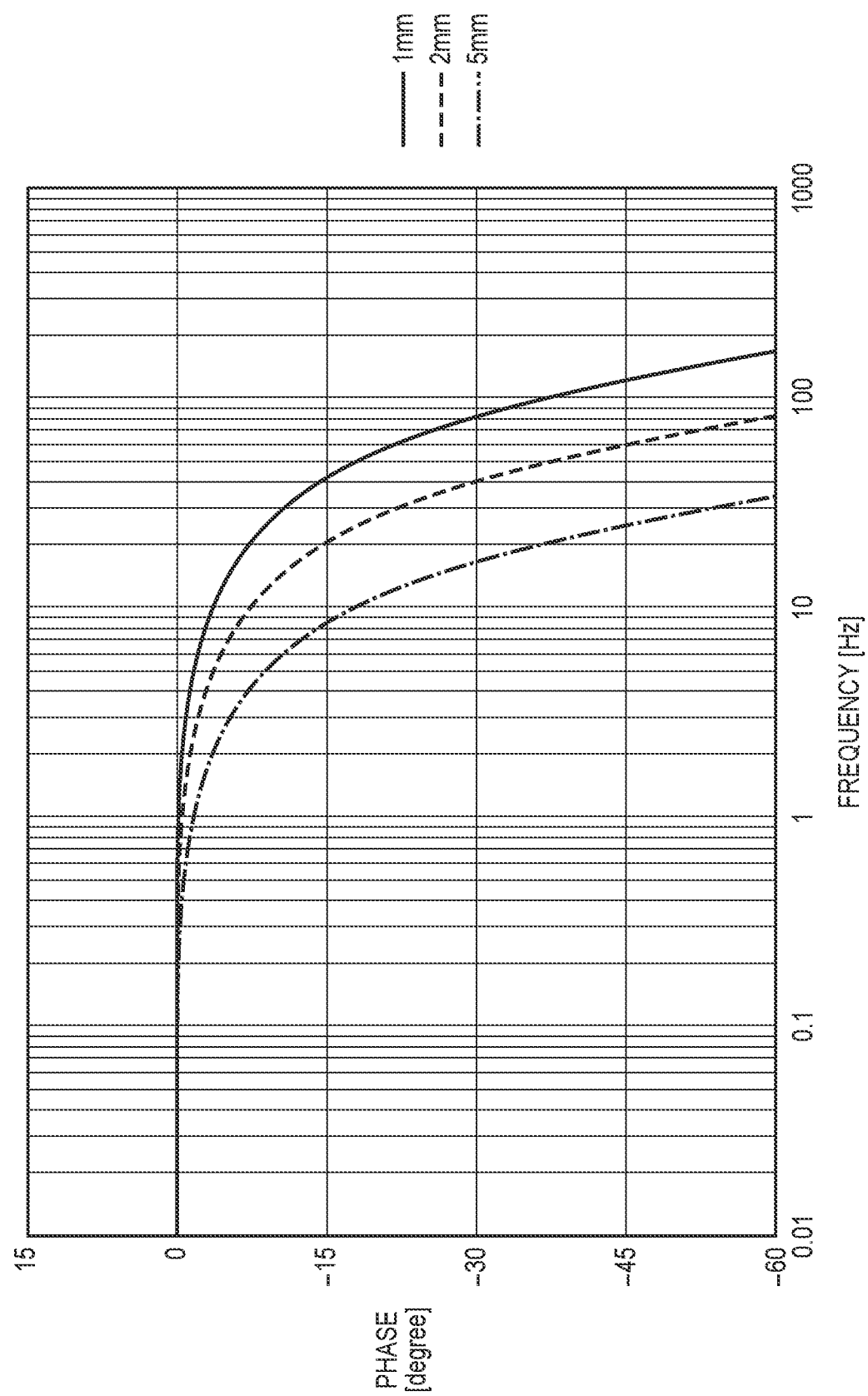
FIG. 6 is a graph showing frequency characteristics of a phase delay of a correction amount.

As an example, when a communication delay ΔT is set to 1 ms, 2 ms and 5 ms, the phase delay θ for each frequency will, based on equation (2), have the frequency characteristics shown in FIG. 6. Also, FIG. 7 shows the phase delay that occurs in the correction amount when the correction amount is given as a 10 Hz sine wave and the communication delay ΔT is given as 5 ms. Also, FIG. 7 represents image blur that remains in the image without being corrected (hereinafter, also called "correction remainder"), when image blur correction is performed in accordance with a correction amount in which the phase delay occurs. In this way, the communication delay is a factor causing a drop in the image blur correction effect.

In view of this, in the present embodiment, the above-mentioned correction remainder (correction error) that occurs on the slave side (second image blur correction unit 217 of the camera body 100b) is calculated on the master side (interchangeable lens 100a). The master side then performs control to cancel out the correction remainder of the slave side, by allowing for the correction error of the second image blur correction unit 217 in the correction amount of the first image blur correction unit 211.

Figure 5:
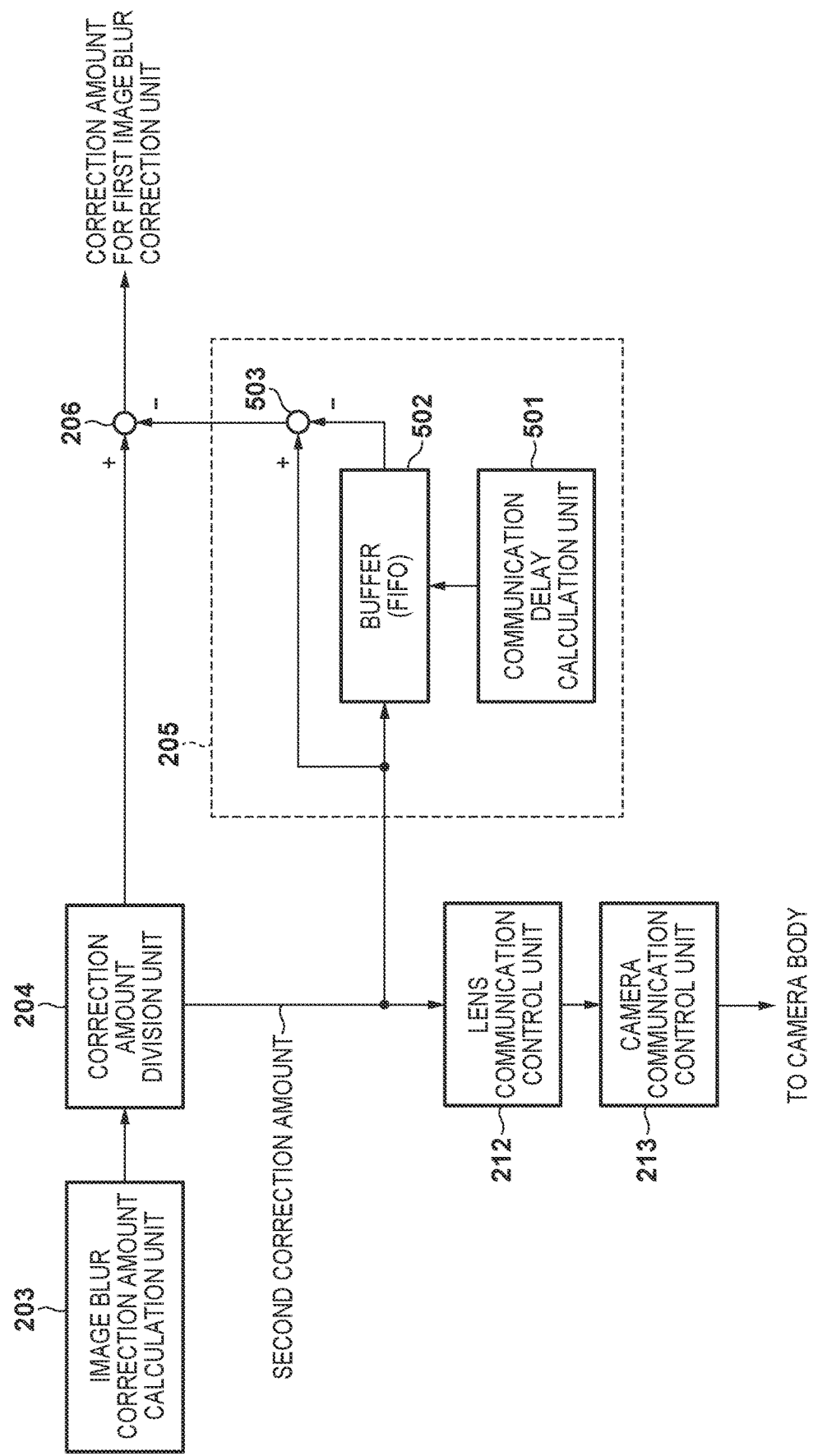
FIG. 5 is a block diagram illustrating a correction error computation unit 205 in detail.

FIG. 5 is a block diagram illustrating the correction error computation unit 205 in detail. The image blur correction amount calculated by the image blur correction amount calculation unit 203 is divided into the first correction amount (master side) and the second correction amount (slave side) in the correction amount division unit 204. The second correction amount is transmitted to the camera body 100b. The second correction amount is also input to the correction error computation unit 205.

The second correction amount input to the correction error computation unit 205 is stored in a buffer 502. The buffer 502 is a memory that temporarily stores the second correction amount in order to add a fixed delay to the second correction amount, and has, for example, a FIFO (first in, first out) structure. A communication delay calculation unit 501 calculates the communication delay ΔT and controls the delay of the buffer 502. As the communication delay ΔT, a delay amount measured in advance for every interchangeable lens can be stored in a computer program. Alternatively, ping communication may be performed in the initial communication when the interchangeable lens 100a is mounted to the camera body 100b, and the communication delay ΔT may be calculated from the response time. A subtractor 503 subtracts the output (delayed correction amount) of the buffer 502 from the second correction amount (original correction amount that is not delayed), and outputs the obtained correction amount. This output of the subtractor 503 is a signal representing the correction remainder of the slave side. The correction remainder thus calculated is supplied to the subtractor 206 as the output of the correction error computation unit 205. The subtractor 206 calculates the final correction amount of the first image blur correction unit 211, by subtracting the output of the correction error computation unit 205 from the first correction amount output by the correction amount division unit 204.

FIGS. 8A to 8F are graph illustrating the effects that result from subtracting the correction error calculated by the correction error computation unit 205 from the first correction amount. The graphs represent the various signals for image blur correction control in time series, with time on the horizontal axis and displacement on the vertical axis.

Figure 8A:
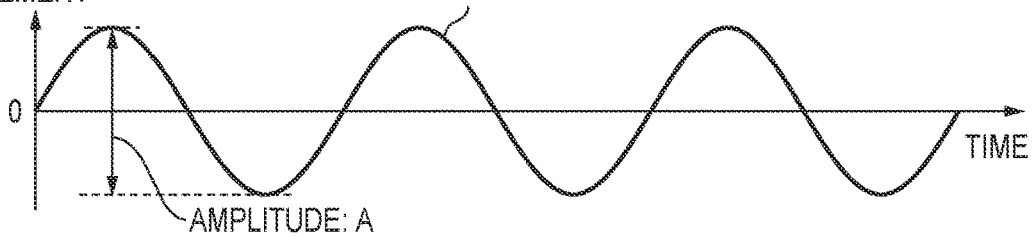
FIGS. 8A to 8F are graphs illustrating the effects that result from subtracting the correction error calculated by the correction error computation unit 205 from a first correction amount.
Figure 8B:
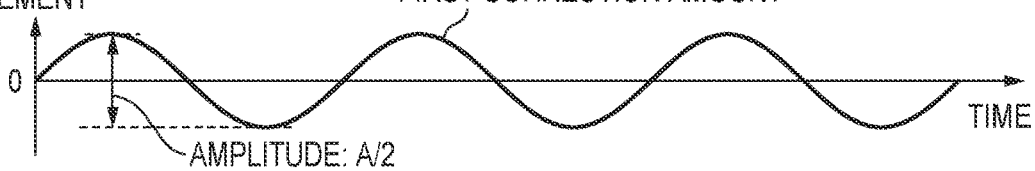
Figure 8C:
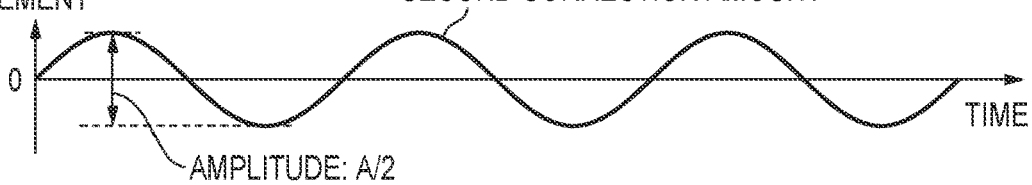

FIG. 8A is a graph showing the image blur correction amount of the entire apparatus that is calculated by the image blur correction amount calculation unit 203. FIG. 8B shows the first correction amount generated by the correction amount division unit 204. Here, in order to simplify the description, a method of dividing the image blur correction amount by a predetermined ratio such as shown in FIG. 4A is employed as the division method of the correction amount division unit 204. K1 is 0.5, and the amplitude of the first correction amount is calculated to be half of the amplitude of an amplitude A of the image blur correction amount calculation unit 203. FIG. 8C shows the second correction amount. The second correction amount is a correction amount obtained by subtracting the first correction amount from the output of the image blur correction amount calculation unit 203, and is calculated to be half of the amplitude A.

Figure 8D:
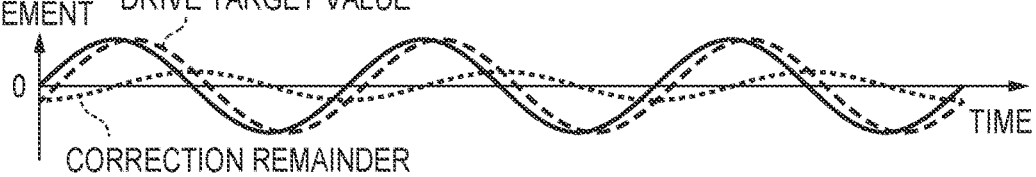

FIG. 8D shows the situation at the time of image blur correction that is performed by the second image blur correction unit 217, with a delay occurring due to the effect of communication of the second correction amount shown with a solid line via the lens communication control unit 112 and the camera communication control unit 127. Thus, the correction target value (drive target value) of the second image blur correction unit 217 will be a signal whose phase is delayed. The correction remainder of the image blur correction that occurs in the case where image blur correction is performed based on a correction amount whose phase is delayed in this way appears as a waveform obtained by subtracting the drive target value of the second image blur correction unit 217 from the second correction amount, and image blur occurs in the image.

Figure 8E:
Figure 8F:
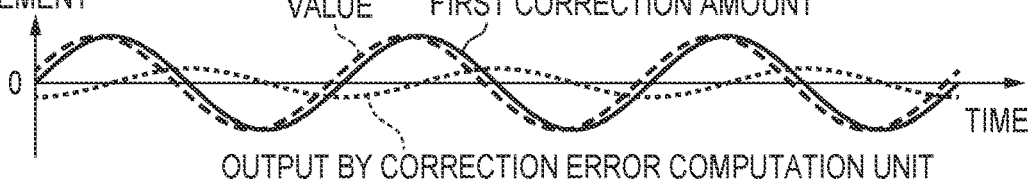

In view of this, in the present embodiment, the correction remainder (correction error) that occurs due to the communication delay is calculated on the master side (interchangeable lens 100a side). The master side then performs control to cancel out the correction error on the slave side, by allowing for the correction error in the drive target value of the first image blur correction unit 211. FIG. 8E shows processing that is performed by the correction error computation unit 205. The correction error computation unit 205 calculates a correction amount obtained by delaying the second correction amount by the communication delay $\Delta T$ ("delayed second correction amount" in FIG. 8E). The correction error computation unit 205 then computes the correction error, by subtracting the delayed second correction amount from the original second correction amount. As can be seen from FIGS. 8D and 8E, this correction error that is calculated by the correction error computation unit 205 is the correction remainder in FIG. 8E. FIG. 8F shows the drive target value of the first image blur correction unit 211 that is obtained by subtracting the correction error calculated by the correction error computation unit 205 from the first correction amount.

By performing image blur correction according to the drive target value of the first image blur correction unit 211 and the second image blur correction unit 217 calculated in this way, it becomes possible to cancel out the effect of the phase delay due to the communication delay.

As described above, according to the first embodiment, the interchangeable lens 100a divides the correction amount calculated based on the shake of the image capturing apparatus 100 into the first correction amount and the second correction amount, and transmits the second correction amount to the camera body 100b. Also, the interchangeable lens 100a acquires the correction error of the second image blur correction unit 217 of the camera body 100b, based on the communication delay of the second correction amount. The interchangeable lens 100a then controls the first image blur correction unit 211 based on the first correction amount and the correction error. It thereby becomes possible to reduce the correction error caused by the communication delay of the second correction amount that occurs between the interchangeable lens 100a and the camera body 100b.

Note that, in the present embodiment, a system configuration was described in which the interchangeable lens 100a operates as the master and the camera body 100b operates as the slave. However, a system configuration can also be employed in which the camera body 100b operates as the master and the interchangeable lens 100a operate as the slave. That is, a system configuration can also be employed in which the first correction amount and the second correction amount of image blur correction are calculated using the output of the camera shake detection unit 124 of the camera body 100b, and the second correction amount is transmitted to the interchangeable lens 100a.

Second Embodiment

Next, a second embodiment will be described. In the present embodiment, the basic configuration of the image capturing apparatus 100 is similar to the first embodiment (refer to FIG. 1). Hereinafter, the description will mainly focus on the differences from the first embodiment.

In the first embodiment, a configuration was described in which the first image blur correction unit 211 and the second image blur correction unit 217 perform image blur correction in a coordinated manner, by calculating the image blur correction amount of the entire image capturing apparatus using the angular velocity sensor 201 on the interchangeable lens 100a side and dividing the calculated correction amount. On the other hand, in the second embodiment, a configuration will be described in which the correction amount for driving the individual image blur correction units is calculated, using angular velocity sensors provided in both the interchangeable lens 100a and the camera body 100b. In the case of this configuration, overcorrection occurs when the shake information detected by the individual angular velocity sensors is used directly to perform image blur correction, and correct image blur correction cannot be performed. In view of this, the interchangeable lens 100a transmits the image blur correction amount to the camera body 100b, and the camera body 100b subtracts the image blur correction amount of the interchangeable lens 100a from the image blur correction amount calculated in the camera body 100b. The camera body 100b controls the second image blur correction unit 217 based on the correction amount obtained by this subtraction.

Figure 9:
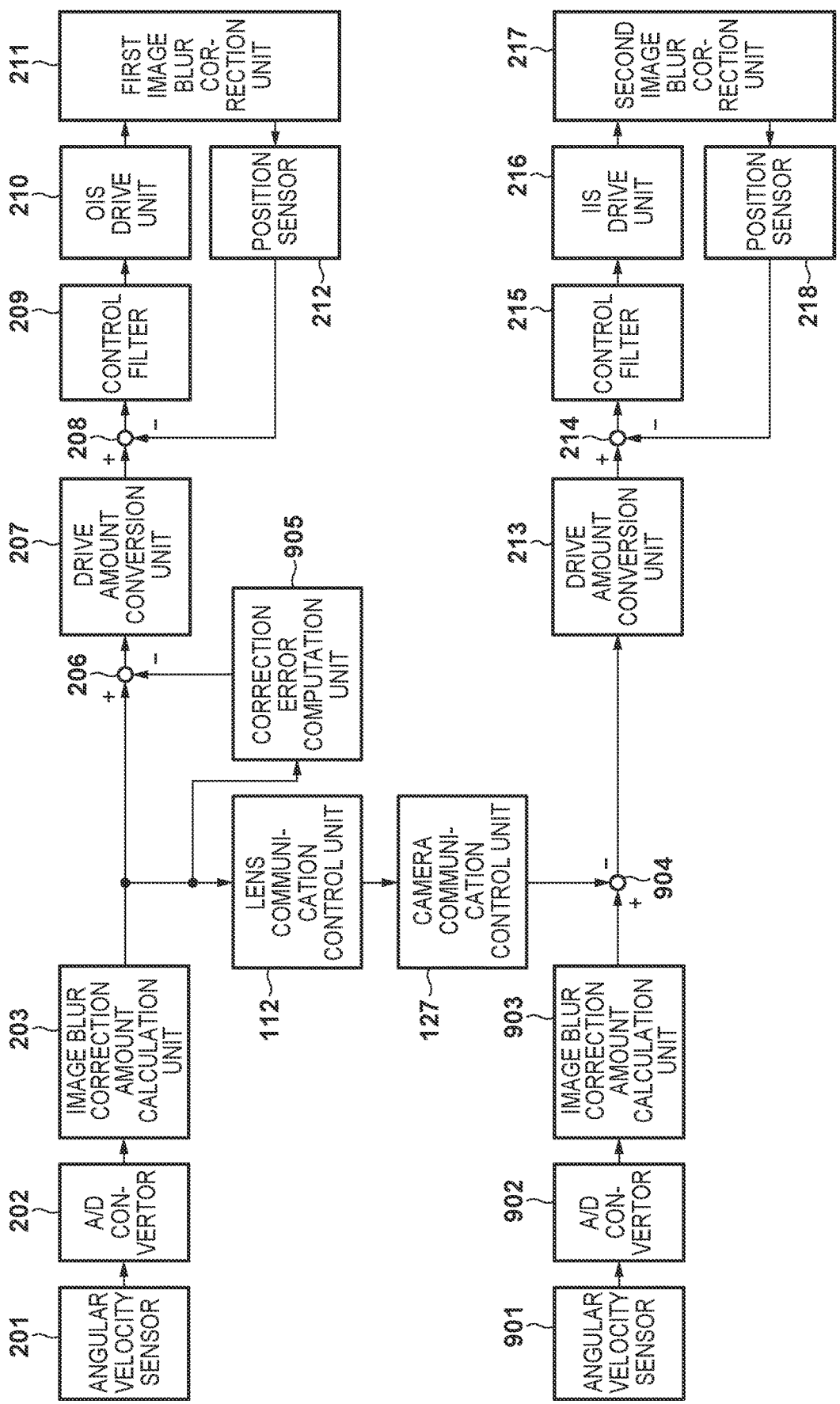
FIG. 9 is a block diagram illustrating image blur correction control according to a second embodiment.

FIG. 9 is a block diagram illustrating image blur correction control according to the second embodiment. In comparison to FIG. 2, the correction amount division unit 204 is omitted, and an angular velocity sensor 901, an A/D convertor 902, an image blur correction amount calculation unit 903 and a subtractor 904 are added. Also, a correction error computation unit 905 is provided instead of the correction error computation unit 205.

In FIG. 9, the angular velocity sensor 901 and the A/D convertor 902 are included in the camera shake detection unit 124 of the camera body 100b. The image blur correction amount calculation unit 903 and the subtractor 904 are implemented by the camera system control unit 126. The correction error computation unit 905 is implemented by the lens system control unit 111.

The angular velocity sensor 901 detects the angular velocity of shake that is applied to the camera body 100b, and outputs a voltage that depends on the detected angular velocity. The output voltage of the angular velocity sensor is converted into digital data by the A/D convertor 902 and acquired as angular velocity data, and the angular velocity data is supplied to the image blur correction amount calculation unit 903.

The image blur correction amount calculation unit 903 performs similar processing to the image blur correction amount calculation unit 203 described in the first embodiment. The correction amount that is calculated here is, however, the second correction amount for performing image blur correction with the second image blur correction unit 217, and differs from the processing of the image blur correction amount calculation unit 203 in this respect. Accordingly, in relation to the image blur correction amount calculation unit 903, a limiter value that is set in the limiter 304 of FIG. 3 is based on the movable range of the second image blur correction unit 217. Note that the image blur correction amount calculation unit 203 on the interchangeable lens 100a side calculates the first correction amount for performing image blur correction with the first image blur correction unit 211, using the angular velocity sensor 201 on the interchangeable lens 100a side.

The subtractor 904 subtracts the first correction amount received via the lens communication control unit 112 and the camera communication control unit 127 from the second correction amount calculated by the image blur correction amount calculation unit 903. The output of the subtractor 904 is converted by the drive amount conversion unit 213 into a drive target value for performing image blur correction with the second image blur correction unit 217. Subtracting the first correction amount of the interchangeable lens 100a from the second correction amount of the camera body 100b in this way enables appropriate image blur correction to be performed without overcorrecting. Also, the second image blur correction unit 217 acts to correct image blur that was not corrected on the interchangeable lens 100a side in cases such as where the movable range of the first image blur correction unit 211 is exceeded. The range over which correction is possible can thereby be expanded.

However, a communication delay arises, since the first correction amount of the interchangeable lens 100a that is subtracted by the subtractor 904 is transmitted via the lens communication control unit 112 and the camera communication control unit 127. Accordingly, phase delay occurs in the first correction amount of the interchangeable lens 100a due to the communication delay. As a result, the output of the subtractor 904 will include a correction error caused by the phase delay of the first correction amount of the interchangeable lens 100a.

In view of this, in the present embodiment, the interchangeable lens 100a calculates the correction error caused by the phase delay of the first correction amount that is transmitted to the camera body 100b, using the correction error computation unit 905, and controls the first image blur correction unit 211 to cancel out the correction error.

Figure 10:
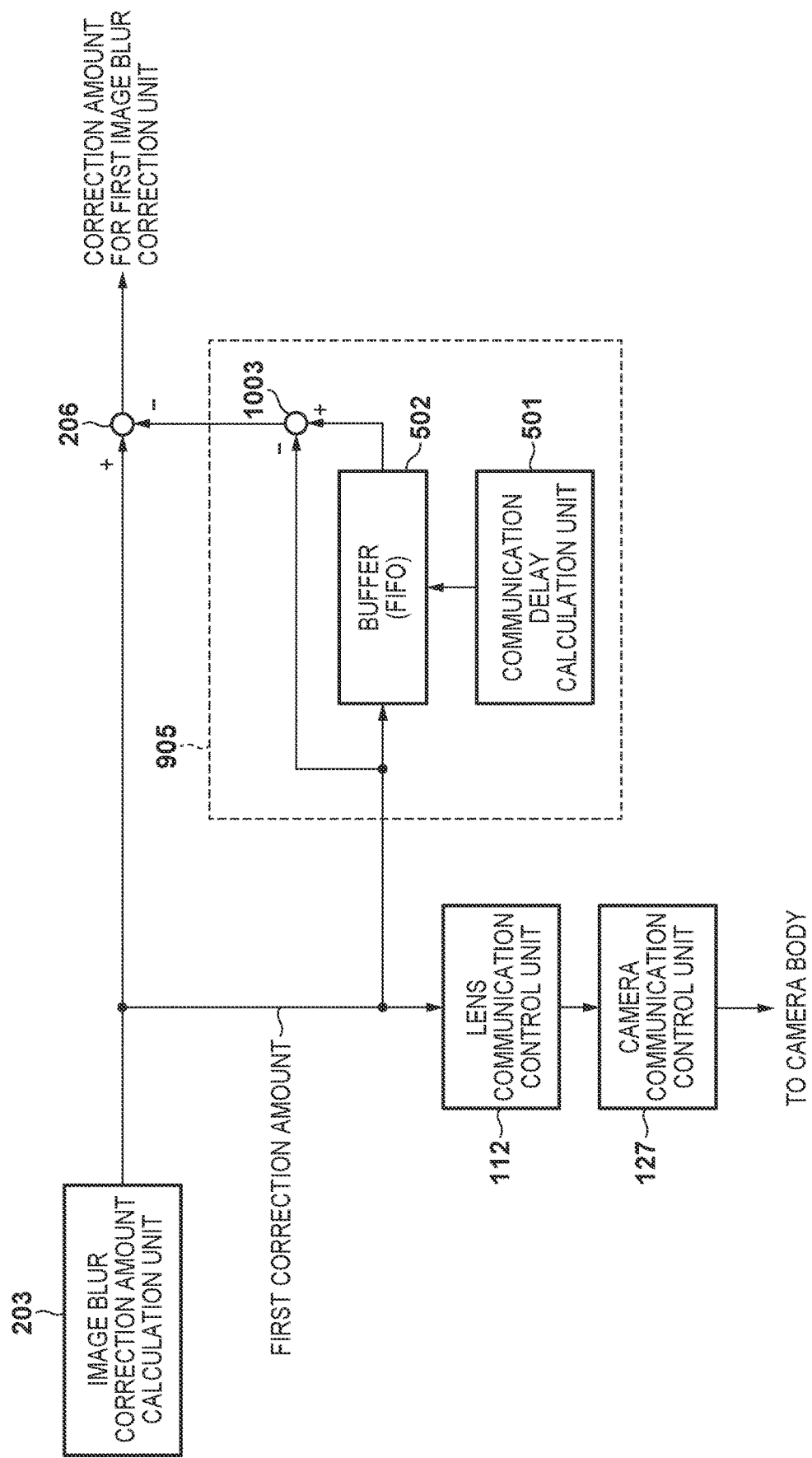
FIG. 10 is a block diagram illustrating a correction error computation unit 905 in detail.

FIG. 10 is a block diagram illustrating the correction error computation unit 905 in detail. The image blur correction amount (first correction amount) calculated by the image blur correction amount calculation unit 203 is transmitted to the camera body 100b via the lens communication control unit 112 and the camera communication control unit 127, and is supplied to the correction error computation unit 905.

The configuration and operations of the correction error computation unit 905 are substantially the same as the configuration and operations of the correction error computation unit 205 described in the first embodiment with reference to FIG. 5, although a subtractor 1003 is provided instead of the subtractor 503. The subtractor 1003 subtracts the first correction amount (original correction amount that is not delayed) from the output (delayed correction amount) of the buffer 502, and outputs the obtained correction amount. The "+" and "−" signs are reversed as compared with the subtractor 503 because the "−" sign in the subtractor 904 is given to the first correction amount transmitted to the camera body 100b. This output of the subtractor 1003 is a signal representing the correction remainder of the slave side. The correction remainder (correction error) thus calculated is supplied to the subtractor 206 as the output of the correction error computation unit 905. The subtractor 206 calculates the final correction amount of the first image blur correction unit 211, by subtracting the output of the correction error computation unit 905 from the first correction amount calculated by the image blur correction amount calculation unit 203.

By performing image blur correction according to the drive target value of the first image blur correction unit 211 and the second image blur correction unit 217 calculated in this way, it becomes possible to cancel out the effect of the phase delay due to the communication delay.

As described above, according to the second embodiment, the interchangeable lens 100a transmits the first correction amount calculated based on the shake of the image capturing apparatus 100 to the camera body 100b. Also, the interchangeable lens 100a acquires the correction error of the second image blur correction unit 217 of the camera body 100b, based on the communication delay of the first correction amount. The interchangeable lens 100a then controls the first image blur correction unit 211 based on the first correction amount and the correction error. It thereby becomes possible to reduce the correction error caused by the communication delay of the first correction amount that occurs between the interchangeable lens 100a and the camera body 100b.

Note that, in the present embodiment, a system configuration was described in which the first correction amount of the interchangeable lens 100a is transmitted to the camera body 100b, and the first correction amount is subtracted from the second correction amount calculated by the camera body 100b. That is, in the present embodiment, a system configuration was described in which the camera body 100b corrects image blur that cannot be corrected by the interchangeable lens 100a. However, a system configuration can also be employed in which the second correction amount of the camera body 100b is transmitted to the interchangeable lens 100a, and the second correction amount is subtracted from the first correction amount calculated by the interchangeable lens 100a. In this case, the processing of the correction error computation unit 905 and the subtractor 206 is executed in the camera body 100b.

Third Embodiment

Next, a third embodiment will be described. In the present embodiment, the basic configuration of the image capturing apparatus 100 is similar to the first embodiment (refer to FIG. 1). Hereinafter, the description will mainly focus on the differences from the first embodiment.

In the first embodiment, a configuration was described in which the first image blur correction unit 211 and the second image blur correction unit 217 are coordinated to perform image blur correction, by calculating the image blur correction amount of the entire image capturing apparatus using the angular velocity sensor 201 on the interchangeable lens 100a side and dividing the calculated correction amount.

A configuration was employed in which the correction amount for the second image blur correction unit 217 is transmitted from the interchangeable lens 100a to the camera body 100b via the lens communication control unit 112 and the camera communication control unit 127 at that time.

In the third embodiment, a receiving buffer 1001 is provided after the camera communication control unit 127 which is on the receiving side.

Figure 11:
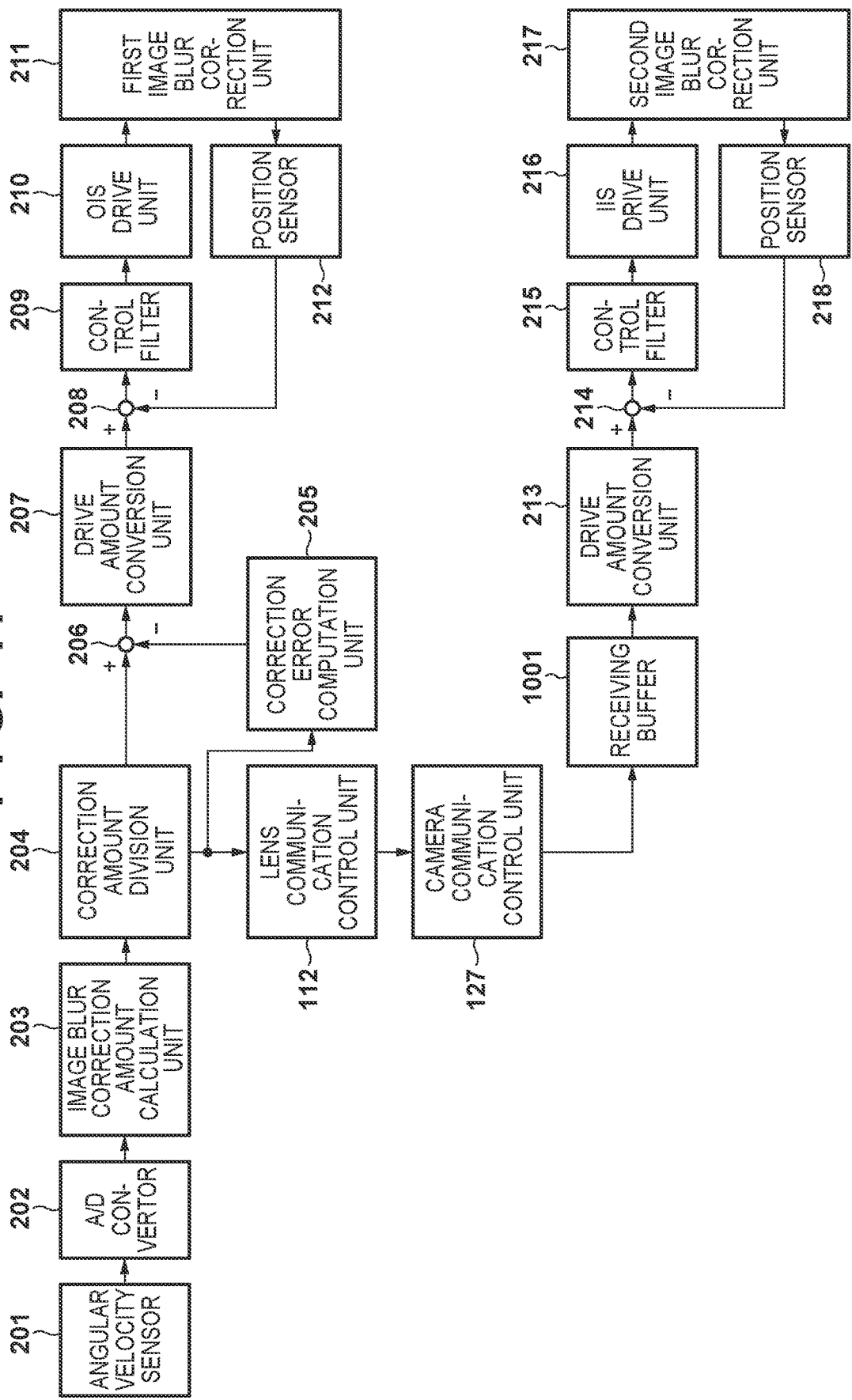
FIG. 11 is a block diagram illustrating image blur correction control according to a third embodiment.

FIG. 11 is a block diagram illustrating image blur correction control according to the third embodiment. In comparison to FIG. 2, the receiving buffer 1001 is provided between the camera communication control unit 127 and the drive amount conversion unit 213.

The role of the receiving buffer 1001 will be described. As described in the first embodiment, the first embodiment is sufficient in the case where a fixed communication delay occurs. On the other hand, communication between the lens communication control unit 112 and the camera communication control unit 127 is not performed solely for the purpose of image blur correction. As an example, such communication is also utilized for focusing and the like. Communication is hierarchized, and the communication delay may not be fixed due to interrupts from communication having a higher priority. In the third embodiment, the receiving buffer 1001 is provided for the purpose of handling cases where the communication delay ($\Delta t$) is not fixed for such reasons.

Phase delay due to communication delay was shown in equation (2) and FIG. 7, with the phase delay changing when the delay amount differs. In view of this, the signals received are held by the receiving buffer 1001 until the communication delay reaches a predetermined delay amount, before being sent to the drive amount conversion unit 213. From the standpoint of the drive amount conversion unit 213, the delay amount will be the sum total of the communication delay due to communication between the interchangeable lens and the camera body and the holding time period of the receiving buffer 1001. That is, signals are held by the receiving buffer 1001, so as to eliminate jitter due to the communication delay. In the first embodiment, the phase amount to be compensated changes such as shown in equation (2) and FIG. 7 in the case where communication jitter occurs, although this problem can be solved by removing jitter with the receiving buffer 1001.

In the case where communication jitter exists in FIG. 11, the output of the camera communication control unit 127 will contain jitter, and signals are held by the receiving buffer 1001, such that the signals no longer have jitter after passing through the receiving buffer 1001.

The setting method and preferable length of the holding time period in the receiving buffer 1001 will be described. A shorter holding time period of signals by the receiving buffer 1001 is preferable from the viewpoint of factors such as holding capacity and the stroke of the image blur correction unit. Stroke here refers to the fact when the buffer holding time period is too long, blur that occurs during a fixed time period will be corrected with only the first image blur correction unit 211, which is disadvantageous in terms of the stroke. Because the role of the receiving buffer 1001 is to eliminate communication jitter as mentioned above, the predetermined delay amount can be determined by adding a value corresponding to the amount of jitter that is expected to occur to the communication delay amount in the case where jitter does not occur (communication delay amount in the first embodiment). This amount of jitter can be determined by estimating the communication amount of communication having a higher priority. Furthermore, the communication amount also differs depending on factors such as the operation mode of the image capturing apparatus (camera). As an example, in cases such as where the focus mode is a mode for continuous focusing, communication resulting from operations and instructions for distance measurement is frequently performed. Furthermore, in order to perform focusing at multiple points, a one-off increase in the communication amount may occur. As mentioned above, depending on the operation mode, there may be an increase in the amount of communication, and an increase in the amount of jitter. In view of this, the appropriate holding time period in the receiving buffer 1001 is preferably determined depending on the mode of the image capturing apparatus. Furthermore, because the operation mode is generally set prior to operation of the image blur correction apparatus, determination of the predetermined delay amount can be performed in advance. The holding time period of signals by the receiving buffer 1001 will be the difference between the communication delay that actually occurs and the predetermined delay amount (i.e. the time period from when the receiving buffer 1001 receives the signals until when the predetermined delay occurs). In other words, the holding time period of signals by the receiving buffer 1001 will be a value set based on expected jitter in the case where jitter does not occur. On the other hand, in the case where jitter occurs, the holding time period changes, according to the amount of jitter that has occurred.

Figure 12:
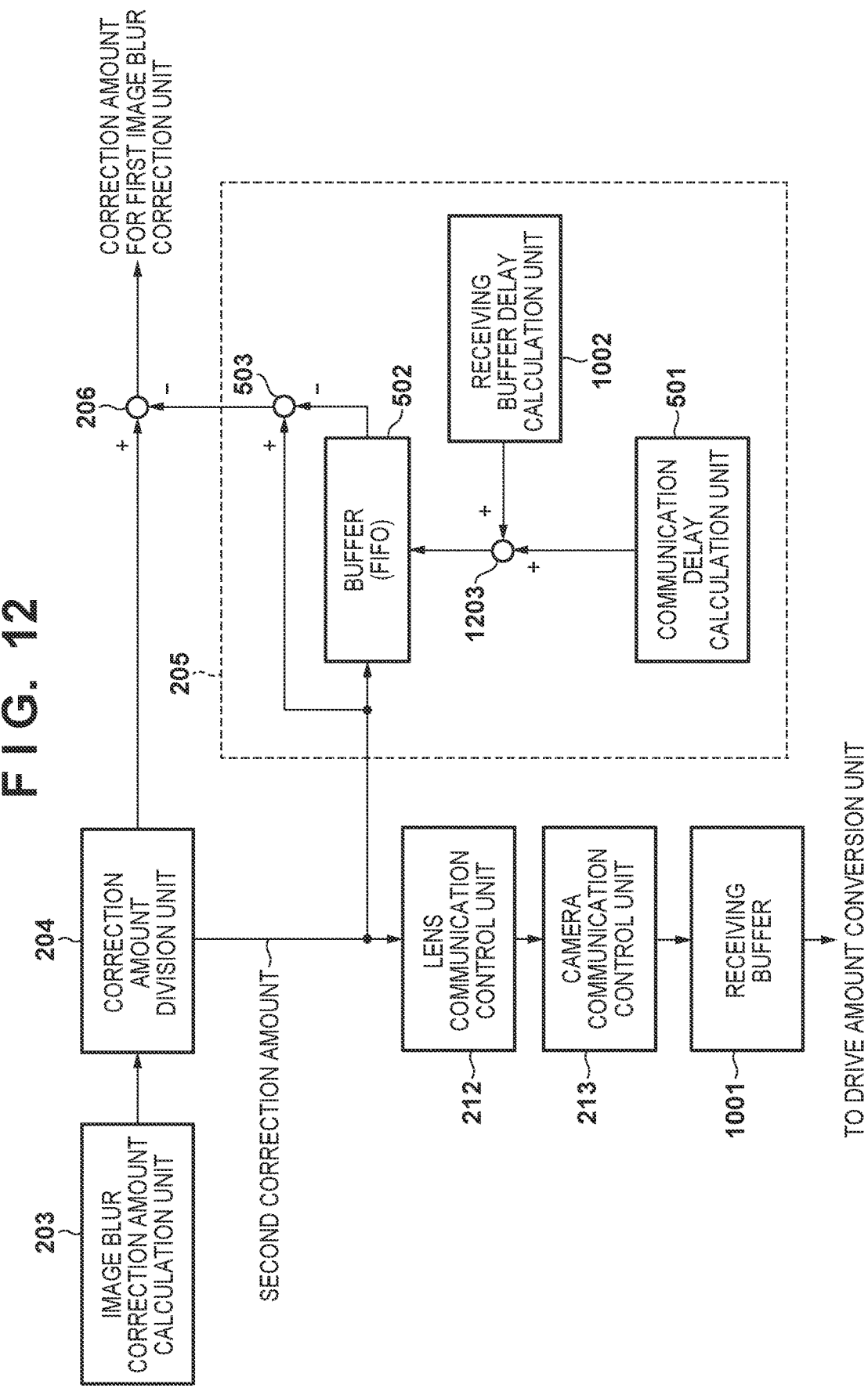
FIG. 12 is a block diagram illustrating the correction error computation unit 205 in the third embodiment.

FIG. 12 is a block diagram illustrating the correction error computation unit 205 in the third embodiment. The configuration is substantially the same as FIG. 5, although a receiving buffer delay calculation unit 1002 and an adder 1203 are provided in addition to the communication delay calculation unit 501. Since the communication delay calculation unit 501 outputs a communication delay decided based on the interchangeable lens, a value corresponding to the amount of jitter that is expected to occur is output by the receiving buffer delay calculation unit 1002. The amount of jitter that is expected to occur is acquired from the camera body 100*b* through communication. The communication delay that is decided based on the interchangeable lens 100*a* (communication delay when there is no jitter) and a value corresponding to the amount of jitter that is expected to occur are added together by the adder 1203, and the predetermined delay amount is output to the buffer 502. The correction error of the second correction unit caused by the delay of the receiving buffer can thereby be acquired, in addition to the communication delay.

A specific example of deriving the delay amount caused by the delay of the receiving buffer with the receiving buffer delay calculation unit 1002 will be shown. In a typical camera system, the camera body 100*b* is often the master in communication. Various settings by the user are also generally configured with the camera body 100*b*. The following description envisions such a case. Settings by the user are configured via an operation unit of the camera body 100*b* having the second image blur correction unit 217. The focus mode or the like is given as an example. The camera system control unit 126 in the camera body 100*b* determines the jitter amount that is expected to occur depending on the set mode. The smallest delay amount possible that exceeds this jitter amount is set in the receiving buffer 1001 as the value corresponding to the jitter amount that is expected to occur, and the set delay amount is notified to the lens system control unit 111 via the camera communication control unit 127 and the lens communication control unit 112. The lens system control unit 111 need only provide the receiving buffer delay calculation unit 1002 with a value that is the same delay as the delay amount in the receiving buffer 1001, in accordance with the notified value.

Description regarding the smallest delay amount possible that exceeds the jitter amount in the above description will be additionally given. In the configuration herein, as mentioned in the description of the first embodiment, acquisition of angular velocity data is performed at a sufficiently higher speed (1000 Hz, etc.) than camera shake. On the other hand, as mentioned in the Description of the Related Art herein, in order to reduce the effect of the communication delay, it is necessary to speed up the communication cycle between the interchangeable lens and the camera body, although the system load is considerable. That is, herein, communication between the lens communication control unit 112 and the camera communication control unit 127 is performed at a fixed cycle slower than acquisition of the angular velocity data. For example, 60 Hz (=16.67 ms) or the like. Here, in the case where the jitter amount is expected to be around 40 ms, communication can be performed at a three-frame (=50 ms) delay.

As a result of the configuration in FIG. 12, the final correction amount of the first image blur correction unit 211 can be calculated, such that performance deterioration of the image blur correction unit due to jitter does not occur.

Note that, in FIG. 12, a configuration is adopted in which the communication delay calculation unit 501 and the receiving buffer delay calculation unit 1002 are both provided, but a configuration may be adopted in which one of the communication delay calculation unit 501 and the receiving buffer delay calculation unit 1002 is provided. In other words, a configuration can also be adopted in which a predetermined delay amount obtained by adding a value corresponding to the jitter amount that is expected to occur to the communication delay amount that is decided based on the interchangeable lens 100a is acquired from the camera body 100b and output to the buffer 502.

Figure 13:
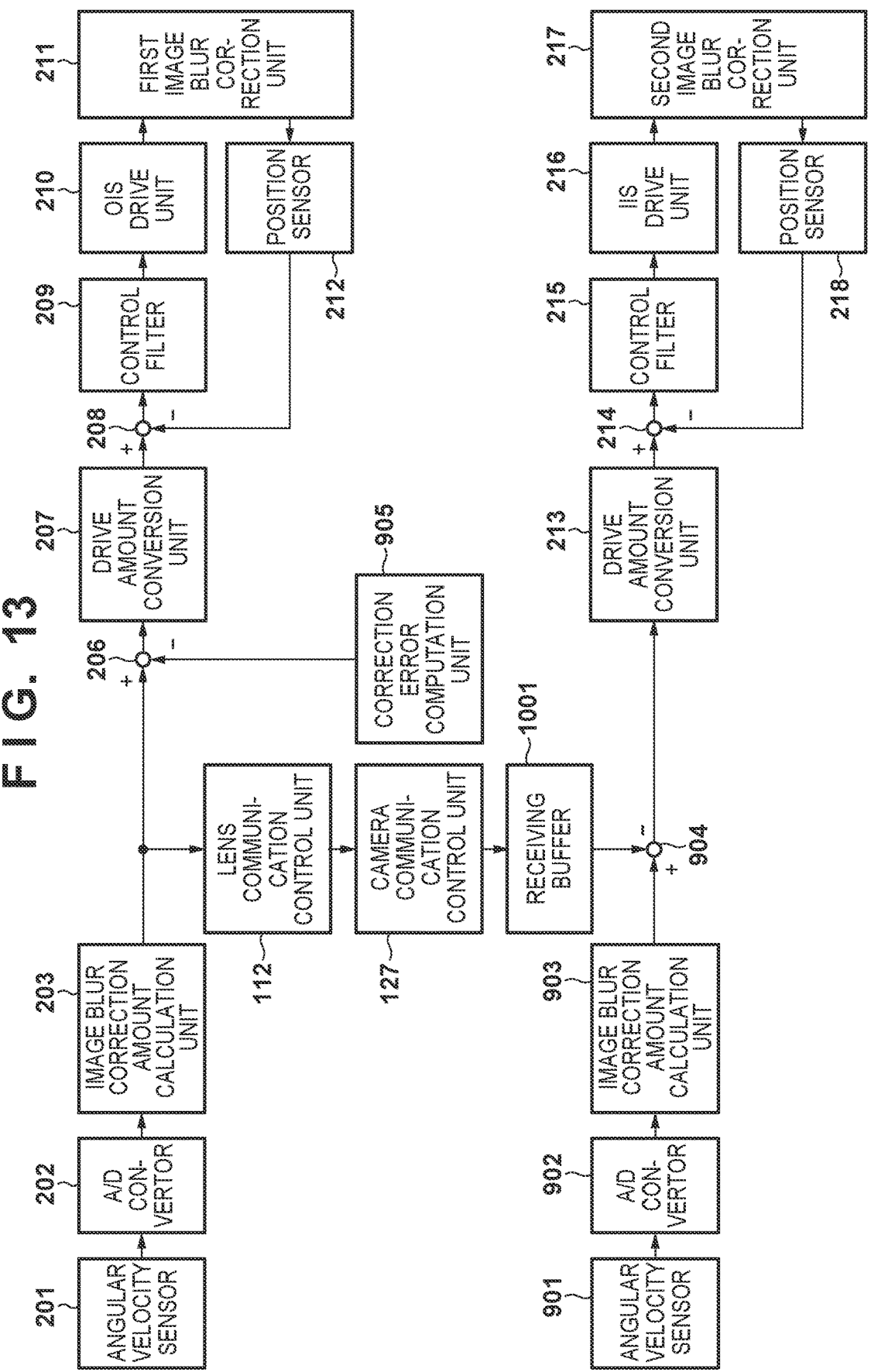
FIG. 13 is a diagram showing a way of providing a receiving buffer 1001 compatible with the second embodiment.

A way of providing the receiving buffer 1001 that is compatible with the second embodiment is shown in FIG. 13. In this case, the receiving buffer 1001 can be provided between the camera communication control unit 127 and the subtractor 904. With regard to the correction error computation unit 205, using the configuration shown in FIG. 11 enables the final correction amount of the first image blur correction unit 211 to be calculated, such that performance deterioration of the image blur correction unit due to jitter does not occur.

Other Embodiments

The aforementioned embodiments describe configurations for performing shake detection using an angular velocity sensor, but shake detection may be performed using other configurations. For example, a configuration can be employed in which the shake amount is calculated from acceleration using an acceleration sensor or the shake amount of the apparatus is calculated by detecting motion information from image data.

Embodiment(s) of the present invention can also be realized by a computer of a system or apparatus that reads out and executes computer executable instructions (e.g. one or more programs) recorded on a storage medium (which may also be referred to more fully as a 'non-transitory computer-readable storage medium') to perform the functions of one or more of the above-described embodiment(s) and/or that includes one or more circuits (e.g. application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g. central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-004465, filed Jan. 15, 2018 and Japanese Patent Application No. 2018-238649, filed Dec. 20, 2018, which are hereby incorporated by reference herein in their entirety.

What is claimed is:

1. An image blur correction apparatus including a communication device configured to communicate with a second image blur correction apparatus that controls a second correction member configured to correct image blur of an image capturing apparatus, the image blur correction apparatus comprising one or more processors and a memory storing a program which, when executed by the one or more processors, causes the image blur correction apparatus to function as:
    a detection unit configured to detect shake occurring in the image capturing apparatus;
    a determination unit configured to, based on the shake, determine a first correction amount that is for correcting the image blur;
    a transmission unit configured to transmit the first correction amount to the second image blur correction apparatus via the communication device, the second image blur correction apparatus controlling the second correction member based on the first correction amount;
    an acquisition unit configured to acquire a correction error caused by a communication delay of the first correction amount in the communication device; and
    a control unit configured to control a first correction member configured to correct image blur of the image capturing apparatus so as to reduce the correction error,
    wherein the acquisition unit acquires the correction error based on a difference between the first correction amount currently determined by the determination unit and a fourth correction amount corresponding to the first correction amount previously determined by the determination unit and transmitted by the transmission unit.

2. The image blur correction apparatus according to claim 1,
    wherein the acquisition unit acquires the correction error, by subtracting a correction amount obtained by delaying the first correction amount in accordance with the communication delay from the first correction amount.

3. The image blur correction apparatus according to claim 1,
    wherein the determination unit is further configured to, based on the shake, determine a second correction amount that is for correcting the image blur, and
    wherein the control unit controls the first correction member based on the second correction amount and the correction error.

4. The image blur correction apparatus according to claim 3,
wherein the control unit controls the first correction member based on a correction amount obtained by subtracting the correction error from the second correction amount.

5. The image blur correction apparatus according to claim 3,
wherein the second image blur correction apparatus includes a receiving buffer configured to hold the first correction amount until the communication delay of the received first correction amount reaches a predetermined delay amount, and
the acquisition unit, based on the predetermined delay amount, acquires, as the correction error of the second correction member, a correction error caused by the communication delay of the first correction amount and a holding time period of the first correction amount by the receiving buffer.

6. The image blur correction apparatus according to claim 5,
wherein acquisition of the predetermined delay amount is performed prior to operation of the image blur correction apparatus.

7. The image blur correction apparatus according to claim 5,
wherein the predetermined delay amount is changed depending on a mode of the image capturing apparatus.

8. The image blur correction apparatus according to claim 3,
wherein the determination unit determines the first correction amount and the second correction amount by dividing a correction amount corresponding to the shake by a predetermined ratio into the first correction amount and the second correction amount.

9. The image blur correction apparatus according to claim 3,
wherein the determination unit determines a high frequency component and a low frequency component of a correction amount corresponding to the shake respectively as the second correction amount and the first correction amount.

10. The image blur correction apparatus according to claim 1, wherein the second image blur correction apparatus controls the second correction member based on a third correction amount obtained by subtracting the first correction amount from a second correction amount for correcting the image blur that is determined based on shake occurring in the image capturing apparatus detected by a second detection unit; and
wherein the control unit is configured to, based on the first correction amount and the correction error, control the first correction member so as to reduce the correction error.

11. The image blur correction apparatus according to claim 10,
wherein the acquisition unit acquires the correction error, by subtracting the first correction amount from a correction amount obtained by delaying the first correction amount in accordance with the communication delay.

12. The image blur correction apparatus according to claim 10,
wherein the control unit controls the first correction member based on a correction amount obtained by subtracting the correction error from the first correction amount.

13. The image blur correction apparatus according to claim 10,
wherein the second image blur correction apparatus includes a receiving buffer configured to hold the first correction amount until the communication delay of the received first correction amount reaches a predetermined delay amount, and
the acquisition unit, based on the predetermined delay amount, acquires, as the correction error of the second correction member, a correction error caused by the communication delay of the first correction amount and a holding time period of the first correction amount by the receiving buffer.

14. The image blur correction apparatus according to claim 13,
wherein acquisition of the predetermined delay amount is performed prior to operation of the image blur correction apparatus.

15. The image blur correction apparatus according to claim 13,
wherein the predetermined delay amount is changed depending on a mode of the image capturing apparatus.

16. The image blur correction apparatus according to claim 10,
wherein one of the first correction member and the second correction member includes a lens movable in a direction perpendicular to an optical axis of the image capturing apparatus, and
the other of the first correction member and the second correction member includes an image sensor movable in the direction perpendicular to the optical axis of the image capturing apparatus.

17. An interchangeable lens comprising:
the image blur correction apparatus according to claim 10; and
the first correction member.

18. A camera body comprising:
the image blur correction apparatus according to claim 10; and
the first correction member.

19. The image blur correction apparatus according to claim 1,
wherein one of the first correction member and the second correction member includes a lens movable in a direction perpendicular to an optical axis of the image capturing apparatus, and
the other of the first correction member and the second correction member includes an image sensor movable in the direction perpendicular to the optical axis of the image capturing apparatus.

20. An interchangeable lens comprising:
the image blur correction apparatus according to claim 1; and
the first correction member.

21. A camera body comprising:
the image blur correction apparatus according to claim 1; and
the first correction member.

22. The image blur correction apparatus according to claim 1,
wherein a time at which the first correction amount corresponding to the fourth correction amount was determined by the determination unit precedes a time at which the first correction amount is currently determined by the determination unit by the communication delay.

23. An image blur correction method executed by an image blur correction apparatus including a communication device configured to communicate with a second image blur correction apparatus that controls a second correction member configured to correct image blur of an image capturing apparatus, the image blur correction method comprising:
    detecting shake occurring in the image capturing apparatus;
    based on the shake, determining a first correction amount that is for correcting the image blur;
    transmitting the first correction amount to the second image blur correction apparatus via the communication device, the second image blur correction apparatus controlling the second correction member based on the first correction amount;
    acquiring a correction error caused by a communication delay of the first correction amount in the communication device; and
    controlling a first correction member configured to correct image blur of the image capturing apparatus so as to reduce the correction error,
    wherein in the acquiring, the correction error is acquired based on a difference between the first correction amount currently determined by the determination unit and a fourth correction amount corresponding to the first correction amount previously determined and transmitted.

24. The image blur correction method according to claim 23, wherein the second image blur correction apparatus controls the second correction member based on a third correction amount obtained by subtracting the first correction amount from a second correction amount for correcting the image blur that is determined based on shake occurring in the image capturing apparatus detected by a second detector; and
    wherein based on the first correction amount and the correction error, the first correction member is controlled so as to reduce the correction error.

25. A non-transitory computer-readable storage medium which stores a program for causing an image blur correction apparatus to execute an image blur correction method, the image blur correction apparatus including a communication device configured to communicate with a second image blur correction apparatus that controls a second correction member configured to correct image blur of an image capturing apparatus, the image blur correction method comprising:
    detecting shake occurring in the image capturing apparatus;
    based on the shake, determining a first correction amount that is for correcting the image blur;
    transmitting the first correction amount to the second image blur correction apparatus via the communication device, the second image blur correction apparatus controlling the second correction member based on the first correction amount;
    acquiring a correction error caused by a communication delay of the first correction amount in the communication device; and
    controlling a first correction member configured to correct image blur of the image capturing apparatus so as to reduce the correction error,
    wherein in the acquiring, the correction error is acquired based on a difference between the first correction amount currently determined by the determination unit and a fourth correction amount corresponding to the first correction amount previously determined and transmitted.

26. The non-transitory computer-readable storage medium according to claim 25,
    wherein the second image blur correction apparatus controls the second correction member based on a third correction amount obtained by subtracting the first correction amount from a second correction amount for correcting the image blur that is determined based on shake occurring in the image capturing apparatus detected by a second detector; and
    wherein based on the first correction amount and the correction error, the first correction member is controlled so as to reduce the correction error.

\* \* \* \* \*